(12) United States Patent
Shulman et al.

(10) Patent No.: US 6,197,353 B1
(45) Date of Patent: *Mar. 6, 2001

(54) GLUTEN-DERIVED COLLOIDAL DISPERSIONS, EDIBLE COATINGS THEREFROM AND METHOD OF MAKING

(75) Inventors: Mark L. Shulman, Waltham; Paul J. McGowan, Belmont; Catherine F. Porcella, West Newton; Francis M. Mallee, Acton; Guy A. Crosby, Weston; Radha Iyengar, Belmont, all of MA (US)

(73) Assignee: Opta Food Ingredients, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/220,911

(22) Filed: Dec. 24, 1998

(51) Int. Cl.$^7$ .............................. A23D 15/08; A23D 1/08
(52) U.S. Cl. ................................ 426/52; 426/28; 426/49; 426/93; 426/94; 426/102; 426/292; 426/293; 426/656
(58) Field of Search ................................ 426/28, 49, 52, 426/656, 293, 102, 93, 94, 292

(56) References Cited

U.S. PATENT DOCUMENTS

| | | | |
|---|---|---|---|
| 2,311,485 | 2/1943 | Sturken | 106/153 |
| 2,377,237 | 5/1945 | James | 106/153 |
| 2,475,133 | 7/1949 | Furter et al. | 99/11 |
| 2,791,509 | 5/1957 | Cosler | 426/302 |
| 3,314,800 | 4/1967 | Noznick et al. | 99/127 |
| 3,323,922 | 6/1967 | Durst | 99/166 |
| 3,479,191 | 11/1969 | Cole | 426/303 |
| 3,615,715 | 10/1971 | Mullen | 106/150 |
| 3,653,925 | 4/1972 | Anker et al. | 426/302 |
| 3,782,964 | 1/1974 | Knight et al. | 426/364 |
| 3,840,676 | 10/1974 | Yamamoto et al. | 426/89 |
| 3,991,218 | 11/1976 | Earle et al. | 426/250 |
| 4,066,796 | 1/1978 | McKee | 426/302 |
| 4,224,219 | 9/1980 | Van Blanton et al. | 106/149 |
| 4,267,275 | * 5/1981 | Müller | 426/52 |
| 4,293,572 | 10/1981 | Silva et al. | 426/19 |
| 4,543,370 | 9/1985 | Porter et al. | 424/440 |
| 4,820,533 | 4/1989 | Seaborne et al. | 426/76 |
| 4,876,094 | 10/1989 | Benton et al. | 426/472 |
| 4,876,097 | 10/1989 | Autant et al. | 426/656 |
| 4,942,043 | 7/1990 | Sander | 426/2 |
| 5,021,248 | 6/1991 | Stark et al. | 426/531 |
| 5,182,130 | 1/1993 | Haralampu et al. | 427/3 |
| 5,324,351 | 6/1994 | Oshlack et al. | 106/153 |
| 5,705,207 | 1/1998 | Cook et al. | 426/89 |
| 5,736,178 | 4/1998 | Cook et al. | 426/93 |
| 5,912,031 | * 6/1999 | Fitchett et al. | 426/52 |
| 5,965,708 | 10/1999 | Bassi et al. | 530/374 |

FOREIGN PATENT DOCUMENTS

| | | |
|---|---|---|
| 831943 | 1/1970 | (CA) . |
| 0 585 688 A3 | 3/1994 | (EP) . |
| 0 593 123 A1 | 4/1994 | (EP) . |
| 1323056 | 2/1963 | (FR) . |
| 80/00659 | 4/1980 | (WO) . |
| 89/05589 | 6/1989 | (WO) . |
| 90/03123 | 4/1990 | (WO) . |
| 91/06227 | 5/1991 | (WO) . |
| 93/12667 | 7/1993 | (WO) . |

OTHER PUBLICATIONS (Abstract) Taufel et al. "Enymatic modification of proteins" Nahrung 30 (314)442–443, 1986.*

AFP 2000, "Acid Fungal Protease for Protein Hydrolysis", *Genencor International*, Product No. 4248 (7 pgs.).

Batey, I.L., "Enzymatic Solubilization of Wheat Gluten", *J. Appl. Biochem.*, 7:423–429 (1985), Nouri et al., "Enzymatic Hydrolysis of Wheat Gluten, Part I. Enzymatic Kinetics and Study of Limited Hydrolysis in a Batch Stirred Reactor", *Chem. Eng. J.*, 65:187–194 (1997).

Nouri et al., "Enzymatic Hydrolysis of Wheat Proteins, Part 2: Comparison of Performance of Batch–Stirred and Torus Reactors", *Chem. Eng. J.*, 65:195–199 (1997).

Masson et al., "Limited Hydrolysis of Gamma–gliadin by Pepsin: Fractionation and Partial Characterization of Large Polypeptides", *Academic Press Limited*, pp. 157–163 (1989).

Masson et al., "Peptic Hydrolysis of Gluten, Glutenin and Gliadin from Wheat Grain: Kinetics and Characterization of Peptides", *J. Sci. Agric.*, 37:1223–1235 (1986).

International Search Report, PCT/US90/06441.

Gontard et al., "Edible Wheat Gluten Films: Influence of the Main Process Variable . . . ," *Journal of Food Science*, 57(1):190–199 (1992).

Gontard et al., "Edible Composite Films of Wheat Gluten and Lipids: Water Vapor Permeability . . . ," *Int. lJ. of Food Science and Tech.* 29:39–50 (1994).

Shogren et al., "Functional (Bread making) and Biochemical Properties of Wheat Flour . . . ," *Cereal Chemistry* 46(2):93–102 (Mar. 1969).

N. Gontard, "Edible and Biogradable Films: Study of Wheat Gluten Film–Forming Properties," *C.R. Acad. Agric. Fr.*, 80(4):109–117 (May 25, 1994).

Gontard et al., "Water and Glycerol As Plasticizers Affect Mechanical and Water Vapor . . . ," *J. of Food Science*, 58(1):206–211 (1993).

(List continued on next page.)

*Primary Examiner*—Helen Pratt
(74) *Attorney, Agent, or Firm*—Hamilton, Brook, Smith & Reynolds, P.C.

(57) ABSTRACT

Film forming colloidal dispersions containing gluten-derived proteins and peptides and their methods of manufacture are described. The colloidal dispersion can be coated onto a variety of substrates to provide a glossy sheen to the substrate. The colloidal dispersions can function as an adhesive for adhering particles onto the substrate. Foods coated with the colloidal dispersion are also described.

19 Claims, No Drawings

OTHER PUBLICATIONS

L. Krull and G.E. Inglett, "Industrial Uses of Gluten," *Cereal Science*, 16(8):232–236, 261 (Aug. 1971).

A. Gennadios and C.L. Weller, "Edible Films and Coating from Wheat and Corn Proteins," *Food Technology*, pp. 63–69 (Oct. 1990).

F. Macritchie, "Studies of the Methodolgy for Fractionation and Reconstitution of Wheat Flours," *J. of Cereal Science*, 3:221–230 (1985).

J.A. Bietz and J.S. Wall, "The Effect of Various Extractions on the Subunit Composition . . . ," *American Assoc. of Cereal Chemists*, pp.145–155 (1975).

Weegles et al., "Large–Scale Separation of Gliadins and Their Bread–Making Quality," *J. of Cereal Science*, 20:253–264 (1994).

Khan et al., "Disaggregation of Glutenin with Low Concentrations of Reducing . . . ," *Cereal Chemistry*, 71(3):242–247 (1994).

S. Okamoto, "Factors Affecting Protein Film Formation," *Cereal Science Today*, 23(5):256–262 (May 1978).

Gontard et al., "Edible Films and Coatings From Natural Biopolymers," University de Montpellier II, GBSA.

\* cited by examiner

GLUTEN-DERIVED COLLOIDAL DISPERSIONS, EDIBLE COATINGS THEREFROM AND METHOD OF MAKING

BACKGROUND

Egg wash is typically used as a baking gloss for enhancing the appearance of breads, pies, cakes and other baked goods. However, with the growing concern of Salmonella contamination of processing equipment and food, alternative compositions that provide good gloss finishes on edible substrates are desirable.

SUMMARY OF THE INVENTION

The present invention relates to methods of forming colloidal dispersions containing microparticles of gluten-derived protein and/or peptides. The colloidal dispersions can be maintained as stable, homogeneous dispersions under storage conditions (e.g., ambient, cold or frozen) without microbial contamination. Alternatively, the colloidal dispersions can be dried and rehydrated prior to use.

Colloidal dispersions of the present invention, when cast onto a substrate, form a glossy coating when dried at ambient or elevated temperatures. The films can further serve as an adhesive for adhering particulate material (e.g., seeds, salts, spices, confections, fruit) onto the substrate. Suitable substrates include but are not limited to confections, cooked and dehydrated meats, dessert items, snack foods (e.g., pretzels, chips, tortillas), fried foods (e.g., french fries), candies (e.g., chocolates), fruit (e.g., apples), vegetables, cereals, baked goods, seeds, nuts, beans (e.g., coffee), pharmaceuticals (e.g., vitamins and tablets) and paper.

Edible coatings produced by the present method are clear films which are non-toxic since they are derived from gluten from wheat, corn, rye, barley, rice or sorghum. The colloidal dispersions of the present invention do not contain toxic organic solvents or require extreme pH's, thus, the residues of these undesirable elements are minimized or eliminated.

DETAILED DESCRIPTION OF THE INVENTION

The invention pertains to aqueous colloidal dispersions of gluten-derived proteins and peptides, which when coated onto a substrate will impart a glossy coating thereon. The invention further pertains to methods for making the aqueous, gluten-derived colloidal dispersions, to methods for using the gluten-derived colloidal dispersions as baking gloss, for example, and to edible coatings on various substrates, included foods, pharmaceuticals and papers. The invention further pertains to methods for adhering edible particulate material (e.g., seeds, spices, candies, nuts) onto the surface of a substrate using the colloidal dispersions described herein.

The term "colloidal dispersion" as used herein means a suspension of microparticles of gluten-derived proteins and peptides having a median volume diameter of about 10 microns or less in an aqueous medium. Preferably, the gluten-derived microparticles will be from about 4 to about 5 microns and should be essentially free of starch. The terms "stable" and "homogeneous" as used herein define colloidal dispersions in which substantially all the microparticles of gluten-derived proteins and peptides can remain uniformly dispersed within the aqueous medium for an indefinite period of time under storage conditions, without irreversible precipitation or agglomeration.

Gluten useful in the methods of this invention is found in high concentrations in various grains, such as wheat, corn, rye, barley, rice and sorghum, and in other plant sources. Natural wheat gluten and vital wheat gluten are particularly preferred in the methods of this invention.

In one embodiment of the invention, an aqueous colloidal dispersion of gluten-derived proteins and peptides can be prepared by first dispersing gluten in an aqueous medium at a temperature sufficient to hydrate the gluten. Preferably, gluten is added to water which has been heated to a temperature sufficient to gelatinize starch in the gluten in the aqueous medium, under agitating conditions. A preferred temperature for adequate dispersion is from about 65° C. to about 85° C. As the gluten becomes dispersed within the aqueous medium, the viscosity of the dispersion increases. Therefore, the amount of gluten that can be dispersed in the aqueous medium will be dictated by the desired viscosity and the further processing steps described herein. For example, the amount of gluten which can be dispersed in the aqueous medium will be from about 1% to about 16% solids, with from about 12% to about 15% being most preferred. When adding gluten in the higher solids range, gradual addition of gluten into the aqueous medium is desirable, and will be described in detail below. For purposes of the present invention, "aqueous medium" is defined as water or a solution which is substantially water such as buffer, acid, antioxidant, reducing agent, and/or chelating agent solutions. It is preferred that the aqueous medium, such as water, be pretreated to remove dissolved minerals.

In order to facilitate dispersion of gluten, it may be desirable to acidify the aqueous medium to a pH of from about 3 to about 4 using organic and/or mineral acids (e.g., acetic acid, tartaric acid, citric acid, lactic acid, phosphoric acid, hydrochloric acid and others) with acetic acid and phosphoric acid being preferred. The acid can be added to the aqueous medium prior to, during or after addition of the gluten. The viscosity of the dispersion can be controlled by gradual addition of acid to the dispersion early in the reaction. See Example 4.

The aqueous colloidal dispersion of gluten is heated to a temperature sufficient to gelatinize the starch contained in the gluten such that it can be hydrolyzed in a subsequent treatment step. Preferably, the temperature is from about 65° C. to about 85° C. The gelatinization step should be carried out for from about 10 minutes to about 60 minutes to render all of the starch available for subsequent hydrolysis since the end desired product should be essentially free of starch. The presence of starch significantly reduces the gloss properties of the product and therefore its removal is important. The term "gelatinization" or variant thereof is intended to embrace the generally recognized term but also is intended to encompass the process of rupturing essentially all starch granules present in the starch, thereby releasing amylose and amylopectin. For the purpose of the present invention, the term "solubilize" refers to the absence of any detectable particulate matter, especially partially disrupted starch granules, when viewed under 200 to 400-fold magnification using a standard light microscope.

Next, the gluten-derived colloidal dispersion is cooled to a temperature suitable for enzymatic hydrolysis of the starch contained in the gluten. The purpose of this step is to completely digest the starch to glucose or maltose. The starch hydrolyzing enzyme is an enzyme containing glucoamylase, amylose, pullanase or combination thereof. A preferred enzyme is a glucoamylase, such as Optidex L-300 (Genencor International, Rochester, N.Y.) and AMG (amyloglucosidase; Novo Nordisk). The starch hydrolysis step is carried out for a period of time sufficient to remove essentially all starch from the colloidal dispersion and under conditions operative for the glucoamylase. Preferably, the temperature is near the optimum for the given glucoamylase. The amount of starch removed or hydrolyzed can be ascertained using the modified iodine assay described in detail below in the Examples section.

The resulting aqueous dispersion is treated, under agitation, with a protease to hydrolyze protein contained in the dispersion. A suitable protease is one which is operative at acid pH of from about 1.5 to about 5.5, for example acid fungal protease, such as but not limited to AFP 2000 (Genencor International, Rochester. N.Y.; food grade acid fungal protease obtained by a controlled fermentation of *Aspergillus niger* var.; optimum pH of from about 2.5 to about 3.5 at 37° C. according to the manufacturer). The protein hydrolysis step should be carried out for a period of time suitable to achieve a drop in viscosity and provide gloss. Preferably, the protein hydrolysis reaction should be carried out for about 2 to about 3 hours in order to achieve adequate viscosity and gloss properties of the final product. It has been demonstrated that the degree of protein hydrolysis is important in the final gloss properties of the gluten-derived colloidal dispersions.

The degree of viscosity can be obtained by measuring the time (seconds) that it takes to empty a #2 Zahn cup for monitoring the process or using a Brookfield viscometer for the final product. A preferred viscosity is a gluten dispersion that takes about 16 to about 18 seconds to empty a #2 Zahn cup (Paul N. Gardner Co., Inc., Pompano Beach, Fla.) at 45° C. It is desirable to achieve a viscosity that is compatible with the method by which the colloidal dispersion will be applied to the substrate to be coated. For example, the viscosity should be low enough to atomize the colloidal dispersion through a spray nozzle, e.g., 45 cP for a hand held sprayer, up to 100 cP for a pressurized commercial sprayer.

The degree of gloss is dependent upon the microparticle size of the gluten-derived proteins and peptides. This is controlled by the degree of hydrolysis of the gluten. Adequate gloss properties are based, in part, upon the substrate to be coated and the type of finish desired. Gloss can be measured using known techniques such as by the methods described in the Examples Section. For example, a liquid sample is coated onto a opacity display gloss board and the gloss measurement taken at a 20° angle using a BYK-Gardner Micro-TRI-gloss reflectometer (BYK-Gardner Inc., Silver Spring, Md.) The fraction of light reflected is measured.

The colloidal dispersion is heated to about 100° C. for between about 30 min. to about 2 hours, preferably for about 1 hour. Preferably, the method of heating is by steam injection but other heating methods, such as those described herein, can be used. The purposes of this step are to inactivate the enzyme(s) and to stabilize the colloidal dispersion. The length of heating should be that which is adequate to avoid protein gelation and preserve gloss properties. For example, insufficient heating will result in gelation while overheating will adversely affect gloss.

The resultant colloidal dispersion is cooled and then optionally diluted to a solids content which is suitable for end use. For example, the colloidal dispersion is diluted to achieve a total solids of from about 10 to about 16% by weight. In one embodiment, it is desirable to add a stabilizing agent (e.g., fructose, maltose or other sugars) to improve freeze/thaw properties. The addition of stabilizing agent in amounts of from about 10% to about 30% by weight of solids allows the colloidal dispersion to be stably maintained under freeze and thaw cycles. It has also been shown that the addition of stabilizing agent (e.g., fructose) improves the gloss of the final product compared to similar colloidal dispersion absent the stabilizing agent.

Colloidal dispersion of this invention are stable and do not form gels. The colloidal dispersion comprises microparticles of gluten-derived proteins and peptides having a median volume diameter of about 10 microns or less in an aqueous medium. Preferably, the microparticles are from about 4 to about 5 microns. The colloidal dispersion further comprises soluble peptides and glucose but should be essentially free of starch.

Alternative forms of drying, such as flash drying, fluid-bed drying, drum drying or spray drying can be used as long as the microparticles do not aggregate or fuse to each other. This powder can then be stored and handled without refrigeration or other special handling procedures. Rehydration can be accomplished by adding the powder to water, or an aqueous medium, with agitation sufficient to resuspend the protein particles and form a colloidal dispersion that is similar to the never dried colloidal dispersion and resultant film therefrom. The ratio of powder to water will depend upon the concentration of the final reconstituted product which is desired. It has been demonstrated that a rehydrated colloidal dispersion provides gloss essentially equivalent to similar colloidal dispersion that has never been dried.

Flavors, colors, antioxidants, emulsifiers, oils and/or preservatives (e.g., ascorbic acid, benzoate, sorbate, acetic acid) can also be added to achieve a desired result, such as to extend shelf life, reduce or prevent microbial contamination and the like. In one embodiment, color can be added to achieve the appearance of egg wash, typically used in the baking industry. Additives which are soluble in water can be incorporated in the coating formulation by direct dissolution in the aqueous medium of the colloidal dispersion. Additives which are insoluble in water may be dispersed by surfactants and added as an emulsion or colloidal dispersion. Examples of insoluble additives include but are not limited to oils, flavors, trace minerals, vitamins, nutrients or nutraceuticals (e.g., vitamin A, vitamin E).

The colloidal dispersions can be used in various applications in the food, paper and pharmaceutical industries, including as edible coatings or barriers ir foods or drugs. Suitable substrates include but are not limited to confections, cooked and dehydrated meats, dessert items, snack foods (e.g., pretzels, tortillas, chips), candies (e.g., chocolates), fruit (e.g., apples), vegetables, baked goods (e.g., buns, pastries, pies, bagels, breads), cereals, seeds, nuts (e.g., peanuts, cashews, almonds, macademia), beans (e.g., coffee beans), vitamins, tablets and fried foods (e.g., french fries).

The edible coating can be applied to the substrate of choice by any suitable method. Examples of suitable methods include spraying, dipping, pouring, brushing, rolling, extrusion, coprecipitation, or as a composite, whose rheology and composition allows it to be extruded as a film. The gluten-derived colloidal dispersion is applied to the substrate and dried at ambient or elevated temperature to evaporate the water and cause the microparticles to fuse or coalesce into a continuous film.

The present method using a water-based gluten-derived protein colloidal dispersion has several advantages. The colloidal dispersion can be used directly or can be dried to form a stable powder which can be readily reconstituted with water, or other aqueous medium, prior to use. The colloidal dispersion is stable and homogeneous under storage conditions. The colloidal dispersion forms a continuous, durable film upon curing which is colorless, odorless, bland to the taste, non-toxic and provides gloss. The degree of gloss properties of the film is that defined according to generally accepted terms of the painting industry, e.g., matte, semi-gloss, high gloss. The degree of gloss will be dependent upon the substrate to be coated.

The colloidal dispersions of this invention can function as an adhesive for adhering edible particular material onto the substrate's surface. An "edible particulate material" is defined herein to be any edible thing that can be added to the substrate's surface for the purpose of ornamentation, flavoring or coloration. The exact nature of the particulate material will depend upon the food to be coated. Examples of edible particulate materials include, but are not limited to, fruit pieces, confections (e.g., candies, sprinkles), seeds, salt, spices, and combinations thereof. The edible particulate materials can be applied to the substrate immediately upon coating the substrate with the colloidal dispersions of this invention. Alternatively, the substrate can be coated with the colloidal dispersion and allowed to partially dry until the coating is tacky, then the particulate material(s) can be applied.

Film properties of the gluten-derived protein coating can be modified by controlling the concentration of gluten-derived protein in the colloidal dispersion, the mode of application and the number of layers applied. For example, where a thicker coating is desired, either a colloidal dispersion having a higher gluten-derived protein concentration or multiple layers can be applied.

The invention is further illustrated by the following examples which should not be construed as limiting in any way. All references cited herein are incorporated by reference in their entirety.

EXAMPLES

MATERIALS

PRODUCT CHARACTERIZATION
Film Properties
1. Physical

ASTM methods were used for measuring drying time (ASTM D1640), gloss (BYK-Gardner MicroTri-Gloss reflectometer) (ASTM D523-95), cross-hatch film adhesion (ASTM D-823).

Gloss was also measured on a hamburger bun as a practical index of its potential as a baking gloss. This was done by brushing a light coating on the surface of the bun and then monitoring the rate of drying, dried film continuity, clarity and gloss. One ml of liquid sample is pipetted onto a gloss board (Leneta Company, 9B7-5, 8×11⅜") and coated into a film using a bird film applicator (Leneta Company, AR-5259). The film is dried and gloss is measured using a BYK-Gardner micro-TRI-gloss reflectometer (BYK-Gardner Inc., Silver Spring, Md.) at a 20° C. angle.

The particle size and shape distribution for the protein microparticles were determined using a Coultor Particle Size Analyzer or a light microscope (Olympus, BH-2) equipped with a BioScan Optimas Image Analyzer.
2. Chemical A modified iodine test was done by taking 5–7 drops of wheat gluten gloss suspension, and diluting it with 1 ml of water in a small test tube. The liquid was then boiled for several seconds using a bunsen burner flame. The tube was cooled with tap water followed by adding 1–2 drops of a solution containing 0.5% iodine and 0.5% potassium iodide in 50% ethanol. If starch is present a blue color develops (i.e., positive test). If starch is absent, a yellow color develops (negative test). A green color is indicative of a product containing residual or borderline amounts of starch.
3. Sensory After spraying on hot buns, gloss levels are visually scored from 0 to 5 with 0 representing no gloss and 5 representing excellent gloss.

Samples were prepared for sensory evaluation by drying 1 g of gloss on a plastic weighing dish. Each panelist consumed the films and rated the overall preference, acid intensity, and off flavor intensity using a hedonic scale from 1–9 (1 corresponding to dislike, low intensity and 9 corresponding to like very much, high intensity).

TABLE 1

|  | Overall Preference | Acid Intensity | Off Flavor Intensity |
| --- | --- | --- | --- |
| Phosphoric Acid | 5.09 | 3.46 | 4.10 |
| Acetic Acid | 2.80 | 6.65 | 6.19 |

4. Viscosity
A. Zahn Cup Measurement

Zahn cups are stainless steel cups of a predetermined volume. Each cup has a calibrated centered hole in the bottom. To measure the viscosity of a slurry, a sample of the protein slurry is collected in a 1 quart container. The Zahn cup is dipped into the quart container and permitted to fill completely. Then the Zahn cup is quickly withdrawn from the slurry. A timer is started when the cup clears the slurry. The timer is stopped the moment the cup empties. The elapsed time is recorded and compared with the calibration curve developed for each cup to determine the viscosity.
B. Brookfield Viscosity Viscosity can also be measured using a Brookfield viscometer, according to the manufacturer's protocol.

Example 1

Treatment of Vital Wheat Gluten (VWG) with Glucoamylase and Protease

Vital Wheat Gluten (VWG) (76 grams) was dispersed with stirring in reverse osmosis deionized (RODI) water (421 grams) at 80° C. to 85° C. followed by adding 85% phosphoric acid (3.04 g). In 30 minutes the temperature was reduced to 65±2° C. and a glucoamylase (Optidex L-300; Genencor International, Rochester, N.Y.)(0.27 ml) was added. The stirring was continued at this temperature until starch iodine test was negative (approximately 30 minutes). After that, temperature was reduced to 45±2° C. and acid fungal protease as a powder (Genencor International, Rochester, N.Y.)(AFP 2,000)(19 mg) was added to initiate the protein hydrolysis. The stirred slurry maintained at this temperature for 3 hours. The enzymes were inactivated by heating to boiling point for 5 minutes, sodium benzoate (0.4 grams) as a preservative was added, the suspension was cooled down and adjusted to a pH of 3.0 with phosphoric acid. The final latex provided a shiny gloss both on the Leneta gloss boards and fresh baked buns. The gloss could be improved noticeably adding fructose (up to 30% with respect to solids). Baking gloss is sprayed on hot fresh buns. After drying, the gloss is visually scored from 0 to 5, with 0 representing no gloss and 5 representing excellent gloss.

Example 2
Large Scale Treatment of VWG

A holding tank was filled with 7,335 lbs. of deionized (DI) water. To this volume, 51.9 lbs. of 85 wt % phosphoric acid was added. The acidified water was transferred to a stirred-reaction vessel. A recirculating loop was connected to the bottom part discharge of the reactor. It consisted of a diaphragm pump, a 25 gallon Likwifier, an in-line mixer (Silverson Mixing, East Longmeadow, Mass.), another diaphragm pump and a line that returned the slurry below the fluid surface in the reactor. Agitation of the acidified water was sufficient to produce a vortex. The solution was heated to 77° C.

The recirculating loop was activated. The pump speeds were adjusted to maintain a liquid level in the Likwifier. VWG (Manilda Milling Co,. Shawnee Mission, Kans.) was slowly added to the Likwifier until 1,300 pounds of VWG were wetted. The slurry was held at about 71° C. for 30 minutes until most of the VWG dispersed. The degree of dispersion was monitored by passing a sample of the slurry through a 40 mesh sieve and qualitatively evaluating the residue for amount and particle size.

The slurry was cooled with city water to 65° C. An amylase (Optidex L-300) (Genencor International, Rochester, N.Y.) was added to the slurry in the amount of 2.1 liters. The slurry was held at 65° C. for one hour. At the end of this time, the slurry was sampled and tested for the presence of starch using the iodine method described above. None was found.

The slurry was cooled with city water to 45° C. A protease (AFP 2000, Genencor International, Inc., Rochester, N.Y.) was added to the slurry in the amount of 147 grams. The progress of the protease reaction was followed by the drop in viscosity of the slurry sample. A #2 Zahn cup was used to follow the viscosity decline that accompanied the enzymatic reaction. After three hours, there was not a detectable change in the viscosity.

The slurry was quickly heated to 100° C. using injected steam directly. The slurry was held at 100° C. for 60 minutes. At the end of that period, it was cooled to 25° C.

A solution of DI water and fructose (ADM, Decatur, Ill.) (9.5 kg) was prepared. It was added to the cooled slurry in a proportion such that the final solids were brought to 14.9% and the fructose fraction of the solids was 30%. A preservative (sodium benzoate) was added to the diluted solution at a 0.04% level.

Example 3
Large Scale Preparation of VWG-based Baking Gloss

A holding tank was filled with 7,905 lbs. of deionized (DI) water. To this volume, 63.0 lbs. of 85 wt % phosphoric acid was added. The acidified water was transferred to a stirred-reaction vessel. A recirculating loop was connected to the bottom port of the reactor. It consisted of a diaphragm pump, a 25 gallon Likwifier (American Ingredients Co., Kansas City, Mo.), an in-line mixer (Silverson Mixing, East Longmeadow, Mass.), another diaphragm pump and a line that returned the slurry below the fluid surface in the reactor. Agitation of the acidified water was sufficient to produce a vortex. The solution was heated to 66° C.

The recirculating loop was activated. The pump speeds were adjusted to maintain a liquid level in the Likwifier. Vital wheat gluten (VWG) (Manildra Milling Co., Shawnee Mission, Kans.) was slowly added to the Likwifier until 1,400 pounds of VWG were wetted. The slurry was held at about 65° C. for 30 minutes until most of the VWG dispersed. The degree of dispersion was monitored by passing a sample of the slurry through a 40 mesh sieve and qualitatively evaluating the residue for amount and particle size.

An amylase (Optidex L-300, Genencor International, Inc., Rochester, N.Y.) was added to the slurry in the amount of 2.26 liters. The slurry was held at 65° C. for one hour. At the end of this time, the slurry was sampled and tested for the presence of starch. None was found.

The slurry was cooled with city water to 45° C. A protease (AFP-2000, Genencor International, Inc., Rochester, N.Y.) was added to the slurry in the amount of 159 grams. The progress of the protease reaction was followed by measuring the viscosity of a slurry sample. A #2 Zahn cup was used to follow the viscosity decline that accompanied the enzymatic reaction. After three hours, there was not a detectable change in the viscosity.

The slurry was quickly heated to 100° C. using steam directly added to the reactor contents. The slurry was held at 100° C. for 60 minutes.

A solution of DI water, fructose (ADM, Decatur, Ill.) (185 kg) and phosphoric acid (3.5 liters) was prepared. It was added to the cooled slurry in a proportion such that the final solids were brought to 14.9%, the fructose fraction of the solids was 30% and the slurry pH was 3.0. A preservative (sodium benzoate) was added to the dilution liquor in an amount (3.36 kg) to correspond to a 0.06% level in the final slurry. This dilution liquor was added to the VWG slurry at 96° C.

The slurry was cooled to 71° C. and packaged.

Example 4
Enzymatic Treatment of Vital Wheat Gluten (VWG) Using a Gradual Addition of Acid at Reduced Temperature VWG powder (76 g) and a glucoamylase (Optidex L-300) (0.27 ml) were dispersed with stirring in water (421 g) having temperature of 65±2° C. and containing 8.5% phosphoric acid (10 ml). Within 30 minutes after preparing the slurry the rest of 8.5% phosphoric acid (20 ml) was added either by small portions or continuously. The stirring was continued at said temperature until starch iodine test was negative (totally 1–1.5 hours). After that, the temperature was reduced to 45±2° C. and acid fungal protease as powder (AFP 2,000)(19 mg) was added as a powder. The stirring was maintained at this temperature for 3 hours. The enzymes were inactivated by heating to 95° C. for 10 minutes, benzoic acid (0.4 g) as a preservative was added, the suspension was cooled down and diluted to 12–14% solids and adjusted to a pH of 3.0 with phosphoric acid. The final product provided a shiny gloss; it could be improved noticeably adding fructose (up to 30% of solids). This procedure allows to avoid the lumps forming as well as a high viscous slurry.

Example 5
Use of the Gluten-Derived Gloss Suspension as an Edible Adhesive A. Comparison of Adhesive properties of Gluten-Derived Gloss vs. N-Tack and E-Pro-Glo Loaves of bread were baked and placed upside down on a wire rack. 15 g of gluten gloss of this invention was applied to the bottom of the loaf and 5 g of poppy seeds were evenly distributed on the surface of the loaf. The gloss was allowed to dry for 30 minutes. After the gloss was dry, the loaves were placed on a vibrating bed to stress the poppy seeds, the loaves were also brushed with a pastry brush to dislodge the seeds. The amount of poppy seeds remaining on the loaves were recorded. Gluten gloss of this invention and N-Tack (National Starch Chemical Co., Bridgewater, N.J.) held approximately the same amount of poppy seeds. The gluten gloss of this invention held 27% more seeds than E-Pro-Glo (Excelpro Inc., Los Angeles, Calif.).

B. Adhering Oats and Confections to Cereal with Gluten-Derived Gloss

Thirteen variables were produced to adhere various products to cereal. The cereal was heated for 10–20 minutes prior to application of gloss (17%–22% of product) and then heated to drive off moisture from the gluten-derived gloss. The gluten-derived gloss was effective in adhering oats and small candy pieces.

While this invention has been particularly shown and described with references to preferred embodiments thereof, it will be understood by those skilled in the art that various changes in form and details may be made therein without departing from the spirit and scope of the invention as defined by the appended claims.

We claim:

1. A method for producing an aqueous, gluten-derived colloidal dispersion, which upon application to a substrate imparts a gloss thereon, comprising:
   a) preparing an aqueous dispersion of gluten under agitating conditions;
   b) heating the product of step a) to a temperature sufficient to gelatinize the starch contained in the gluten;
   c) hydrolyzing essentially all starch within the dispersion with a starch hydrolyzing enzyme;
   d) hydrolyzing protein contained in the gluten using a protease under conditions sufficient to change the gluten dispersion viscosity; and
   e) heating the colloidal dispersion to inactivate the protease and stabilize the colloidal dispersion; thereby producing an aqueous, gluten-derived colloidal dispersion which upon application to a substrate imparts a gloss thereon.

2. The method of claim 1 wherein the gluten is from corn, wheat, barley, rice, rye or sorghum.

3. The method of claim 1 wherein the aqueous gluten dispersion is acidified before, during or after the starch hydrolysis step.

4. The method of claim 1 wherein the protein hydrolysis step is carried out at from about 2 to about 3 hours.

5. The method of claim 1 wherein the gelatinization step is carried out at a temperature of from about 65° C. to about 85° C.

6. The method of claim 1 wherein the starch hydrolyzing enzyme is an enzyme containing, glucoamylase, amylase or pullanase having, an activity sufficient to hydrolyze the starch to maltose or glucose.

7. The method of claim 1, further comprising heating the gluten dispersion after starch hydrolysis is completed to inactivate the starch hydrolyzing enzyme.

8. The method of claim 1 further comprising admixing a stabilizing agent into the product of step d).

9. The method claim 1, further comprising the step of diluting the gluten dispersion to obtain a total solids content of from about 11% to about 16% by weight.

10. The method of claim 1, further comprising adding a preservative to the final product.

11. The method of claim 1, further comprising adding color and/or flavor to the final product.

12. The method of claim 1 wherein the amount of gluten dispersed in step a) is from about 10% to about 16% by weight solids.

13. A method for making an edible coating on a substrate, comprising the steps of:
   a) apply an aqueous colloidal dispersion of gluten-derived protein produced by the method of claim 1 to a substrate; and
   b) drying the colloidal dispersion under ambient or elevated temperature to fuse and form an edible continuous coating of gluten-derived protein onto the surface of said substrate.

14. The method of claim 13 wherein the substrate is selected from the group consisting of chocolates, high sugar confections, fruits, meats, baked goods, vegetables, seeds, nuts, beans, cereals, vitamins, tablets, fried foods, french fries and snack foods.

15. A substrate having an edible coating thereon, said coating comprising fused microparticles of a gluten-derived protein from an aqueous colloidal dispersion, produced by the method of claim 1, in which the aqueous phase was removed at ambient or elevated temperature.

16. The coated substrate of claim 15 wherein the substrate is selected from the group consisting of chocolates, high sugar confections, fruits, meats, baked goods, vegetables, seeds, nuts, beans, cereal, vitamins, tablets, fried foods, french fries and snack foods.

17. A method for adhering edible particulate material onto the surface of a substrate, comprising:
   a) coating the substrate with an aqueous, gluten-derived colloidal dispersion produced by the method of claim 1;
   b) applying an edible particulate material onto the coating before the coating completely dries; and
   c) drying the colloidal dispersion under ambient or elevated temperature to fuse and form an edible continuous coating of gluten-derived protein onto the surface of said substrate.

18. The method of claim 17 wherein the edible particulate material is selected from the group consisting of fruit pieces, confections, candies, sprinkles, seeds, salt, spices and combinations thereof.

19. A powder produced by drying an aqueous, gluten-derived colloidal dispersion produced by the method of claim 1.

* * * * *